(12) United States Patent
Casses

(10) Patent No.: US 9,728,891 B2
(45) Date of Patent: Aug. 8, 2017

(54) ELECTRICAL CONNECTOR PROVIDED WITH A CABLE CLAMPING DEVICE

(71) Applicant: DELPHI INTERNATIONAL OPERATIONS LUXEMBOURG S.A.R.L., Bascharage (LU)

(72) Inventor: Claude Casses, Clevilliers (FR)

(73) Assignee: Delphi International Operations Luxembourg, Sarl, Luxembourg (LU)

( * ) Notice: Subject to any disclaimer, the term of this patent is extended or adjusted under 35 U.S.C. 154(b) by 0 days.

(21) Appl. No.: 15/100,731

(22) PCT Filed: Dec. 12, 2014

(86) PCT No.: PCT/EP2014/077555
§ 371 (c)(1),
(2) Date: Jun. 1, 2016

(87) PCT Pub. No.: WO2015/086817
PCT Pub. Date: Jun. 18, 2015

(65) Prior Publication Data
US 2016/0308302 A1    Oct. 20, 2016

(30) Foreign Application Priority Data
Dec. 12, 2013   (FR) ..................................... 13 62486

(51) Int. Cl.
*H01R 13/52*    (2006.01)
*H01R 13/58*    (2006.01)
(Continued)

(52) U.S. Cl.
CPC ......... *H01R 13/582* (2013.01); *H02G 15/007* (2013.01); *H02G 15/013* (2013.01)

(58) Field of Classification Search
CPC ............ H01R 13/5219; H01R 13/5221; H01R 13/5208; H01R 13/59
(Continued)

(56) References Cited

U.S. PATENT DOCUMENTS 4,735,581 A * 4/1988 Endo .................. H01R 13/5205
439/279
5,472,352 A * 12/1995 Nishide .............. H01R 13/5219
439/274
(Continued)

FOREIGN PATENT DOCUMENTS

DE    10 61 861 B    7/1959
EP    1 037 325 A2   9/2000
(Continued)

*Primary Examiner* — Thanh Tam Le
(74) *Attorney, Agent, or Firm* — Robert J. Myers

(57) ABSTRACT

The invention relates to a cable clamping device, for example for an electrical connector, comprising at least one bushing and a clamping ring. The bushing and the clamping ring both comprise an opening for the passage of a cable. A bushing has a number of bushing portions which, joined together, form a sleeve about the cable. Two flanges bear the bushing portions and are articulated to a casing so as to pivot between an unclamped position of each bushing, in which the cable can be moved, and a clamped position, in which each bushing is kept clamped to the cable by the clamping ring. Locking means keep the clamping ring in the position in which the cable is clamped by the bushing.

14 Claims, 2 Drawing Sheets

(51) Int. Cl.
*H02G 15/007* (2006.01)
*H02G 15/013* (2006.01)

(58) Field of Classification Search
USPC .............................. 439/271–275, 462, 587
See application file for complete search history.

(56) References Cited

U.S. PATENT DOCUMENTS

| | | | | |
|---|---|---|---|---|
| 5,795,173 | A * | 8/1998 | Werner | H01R 13/625 439/271 |
| 6,371,807 | B1 * | 4/2002 | Takagishi | H01R 13/5221 439/587 |
| 6,383,022 | B1 * | 5/2002 | Murakami | H01R 13/5208 439/274 |
| 6,409,532 | B2 * | 6/2002 | Payson | H01R 13/622 439/320 |
| 6,454,602 | B1 * | 9/2002 | Sharrow | H01R 13/53 439/462 |
| 6,537,104 | B1 * | 3/2003 | Hagmann | H02G 3/0666 439/460 |
| 7,175,459 | B2 * | 2/2007 | Milner | H01R 13/5213 439/271 |
| 7,303,418 | B2 * | 12/2007 | O'Connor | H01R 13/5208 439/277 |
| 8,007,302 | B2 * | 8/2011 | Kleinke | H01R 9/03 439/275 |
| 8,231,408 | B2 * | 7/2012 | Ebihara | H01R 13/5205 439/587 |
| 9,059,534 | B2 * | 6/2015 | Endo | H01R 13/5205 |

FOREIGN PATENT DOCUMENTS

| | | |
|---|---|---|
| GB | 1 031 777 A | 6/1966 |
| GB | 2 180 106 A | 3/1987 |

* cited by examiner

ELECTRICAL CONNECTOR PROVIDED WITH A CABLE CLAMPING DEVICE

CROSS-REFERENCE TO RELATED APPLICATION

This application is a national stage application under 35 U.S.C. §371 of PCT Application Number PCT/EP2014/077555 having an international filing date of Dec. 12, 2014, which designated the United States, said PCT application claiming the benefit of priority under Article 8 of the Patent Cooperation Treaty to French Patent Application No. 1362486, having a filing date of Dec. 12, 2013, the entire disclosure of each of which are hereby incorporated herein by reference.

TECHNICAL FIELD OF THE INVENTION

The invention relates to the field of electrical connectivity, for example electrical power connectors and, in particular, electrical power connectors for hybrid motor vehicles.

BACKGROUND OF THE INVENTION

Electrical power connectors are used in electric or hybrid motor vehicles, for example in order to connect a set of batteries to an electric motor, to a power converter, etc.

In hybrid vehicles the heat engine generates vibrations that are transmitted to the power cables and therefore also to the connectors and contacts thereof. Because the section of the power cables is relatively large (for example 40 or 50 mm$^2$), said cables are rigid and have a significant inertia. The level of these vibrations can reach 15 G, 25 G or 40 G depending on where the cables and the connectors are located. With such levels of vibration, the points of electrical contact between the electrical contacts of the connectors can become worn prematurely. This results in a risk of heating and even fire. It is therefore important to prevent this risk.

BRIEF SUMMARY OF THE INVENTION

A cable fixing and clamping device is proposed, in particular for an electrical connector, comprising a bushing, a clamping ring and locking means carried at least in part by the clamping ring, making it possible to block the displacement of the clamping ring relative to the bushing. In this document a bushing constitutes fundamentally a hollow sleeve having an essentially cylindrical inner wall ensuring the clamping and the blocking of one or more cables and an outer wall, which likewise is essentially cylindrical and on which a clamping ring is placed. The bushing can be formed of one or more parts (for example two half-bushings). One and/or the other of these parts have/has an inner surface corresponding to at least one substantially cylindrical portion (a half-cylinder for a half-bushing, for example). The bushing can be located for example on a connector or on any other device comprising one or more contacts to be protected from vibrations or upstream thereof.

Numerous forms and configurations of bushings or bushing portions as well as a varying number of bushings can be envisioned. For example, there may be provided two complementary half-bushings forming a substantially cylindrical passage with a closed or almost closed circular circumference when said half-bushings are clamped on the cable. A fixed bushing portion and a bushing portion movable about an axis of rotation to which said bushing portion is articulated can be provided. It is also possible to have two half-bushings movable about the axis of rotation to which said half-bushings are articulated, respectively. It is also possible to have a number of pairs of half-bushings, each pair blocking a cable, respectively.

The bushing and the clamping ring both comprise an opening (i.e. a passage) for passing through a cable. The bushing and the clamping ring are both parts made of plastics material, for example. At least one of the elements from the bushing and the clamping ring has an inner surface intended to press against an outer surface of the cable or an element connected thereto, such as a portion of thermo-shrinking sheath. This inner surface thus comes into contact with the cable in order to block the cable when the clamping ring is displaced, relative to the bushing, from a position in which the clamping ring is disengaged from the bushing and a displacement of the cable is possible, into a position in which the cable is blocked. This inner surface can be located for example on a movable bushing portion (half-bushing for example) carried by a plate (in other words in this context a skirt) articulated about an axis of rotation. If the same plate carries one or more bushing portions, each movable bushing portion is then articulated to a flange about an axis of rotation between an unclamped position, in which the cable can be displaced, and a clamped position, in which the bushing portions are held clamped on the cable by the clamping ring when said ring is manipulated in order to clamp the cable in the clamping device. A movable bushing portion is not only articulated to a flange, but can also be mounted on this flange so as to be removable. It is thus made possible to assemble bulky contacts and a unitary wire seal before the assembly of the bushing portions and respective plates thereof. Each movable bushing portion thus contributes to the blocking of the contact and of the seal, respectively, in a cavity and a recess provided for this purpose.

When the movable bushing is in a position clamped on the cable, the inner surface is distanced from the axis of rotation by a radius greater than the shortest distance between the axis of rotation and the outer surface of the cable. In other words, when the movable bushing portion is in a position clamped by the clamping ring, the inner diameter of the passage of the cable at the bushing is smaller than the outer diameter of the cable and the outer insulating sheath thereof. This is produced thanks to a tilting effect of the bushing portion (or portions) movable about the axis of rotation, which makes it possible to release or partially block the passage of the cable.

It is important to bear in mind that the clamping device according to the invention comprises only few elements and that the clamping ring is the element that is directly manipulated by an operator in order to be displaced, relative to the bushing, from a position in which the cable is not clamped and can still be displaced through the passage formed in the clamping ring and the bushing, into a position in which the cable is blocked and can no longer be displaced easily through the passage.

The locking means are carried at least in part by the clamping ring so as to be activated during the clamping of the clamping ring. The locking means have at least one non-return catch. A non-return catch of this type makes it possible to block the displacement of the clamping ring relative to the bushing in a path or direction opposite the displacement of the clamping ring relative to the bushing. Such locking means also make it possible to prevent the ring from unclamping, even when the fixing device is subjected to strong vibrations, moreover for long periods of time (which would not necessarily be the case with a screw-type device).

The clamping ring is displaced relative to the bushing in a first step by translation in order to clamp the bushing on the cable, then in a second step by rotation in order to lock the clamping ring on the bushing. This has improved ergonomics compared with a rotation of the ring on a thread of the bushing. In fact, in the case of a thread, a number of revolutions of the ring would be necessary in order to obtain the translation sufficient for the displacement of the bushing on the cable. A screwing of this type of the ring on the bushing can prove to be tedious and can be made difficult when the fixing device is located in a cluttered or confined environment.

Thus, in order to provide a displacement of the ring on the bushing in translation parallel to the longitudinal axis of the cable, it is possible to press on the clamping ring parallel to this axis. This can be implemented relatively easily even when the circular surroundings around the clamping ring are cluttered. Likewise, to clamp the ring on the bushing by rotation, it is possible to rotate the clamping ring over less than one revolution. This makes it possible to provide cable clamping devices that are particularly ergonomic.

BRIEF DESCRIPTION OF THE SEVERAL VIEWS OF THE DRAWING

Further features of the invention are disclosed in the claims and/or will become clear by reading the following detailed description and studying the accompanying drawings, in which:

DETAILED DESCRIPTION OF THE INVENTION

Figure 1:
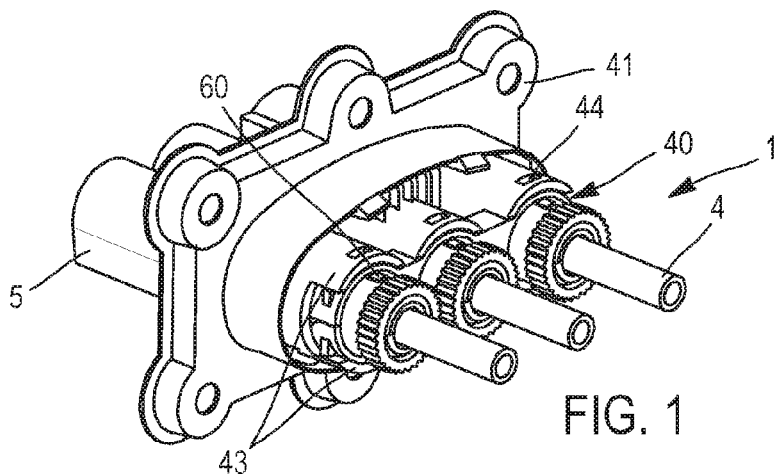
FIG. 1 schematically shows a perspective view of an embodiment of a clamping device according to the invention.

The cable clamping device 1 shown in FIGS. 1, 2A to 2G, 3A to 3D, 4A and 4B is a device for an electrical contact casing 5 intended to be mounted on the body of an electrical power device, such as a converter. At the same time as the mounting of the casing 5 on the power device, the contacts 19 (male contacts here) are connected to female contacts mounted for example on an electrical circuit that has bus bars.

In the illustrated example the clamping device comprises a casing 5, inside which there are formed three cavities 40 (see also FIGS. 3A to 3D). The casing 5 is surrounded at least in part by a metal shield plate 41 suitable for providing a shielding continuity between a braid (not shown) surrounding the cables 4 and the body of an electrical power device (also not shown). The braid is held on the metal shield plate 41 by means of a collar (not shown). The casing 5 and the metal shield plate 41 can be mounted in a screwed manner on the body of the electrical power device.

Figure 2A:
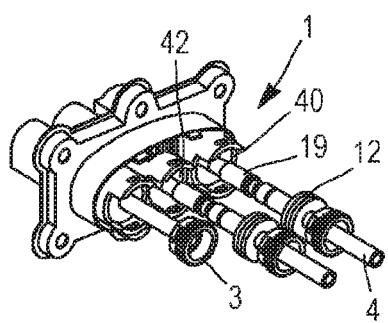
FIGS. 2A to 2G show, in a manner similar to FIG. 1, different steps of the assembly and clamping of the device of FIG. 1.
Figure 2B:
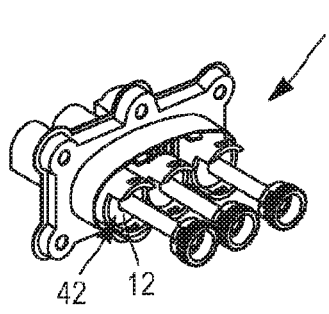

As illustrated in FIG. 2A, each cavity 40 accommodates a contact 19 and a unitary wire seal 12. Before clamping of each contact 19 on a cable 4, a clamping ring 3 and a seal 12 are threaded onto said cable 4. Each contact 19 is then positioned in a cavity 40, then each seal 12 is pushed into a recess 42 located at the rear of each cavity 40 (see FIG. 2B). Each cavity 40 is also extended at the rear by two flange portions 43. Each flange portion 43 extends circularly around each cable 4 over substantially a quarter of a circle. Each flange portion 43 comprises an opening 44.

Figure 2C:
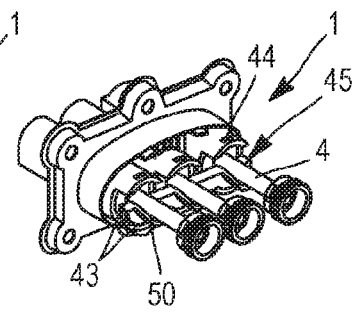
Figure 2D:
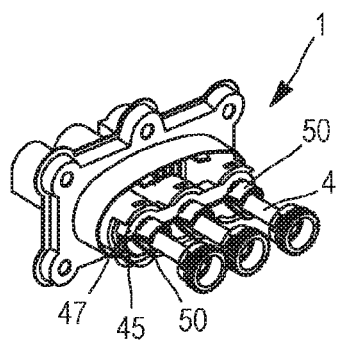
Figure 2E:
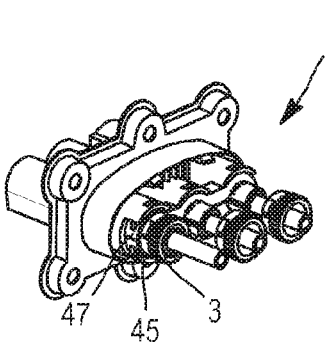
Figure 3A:
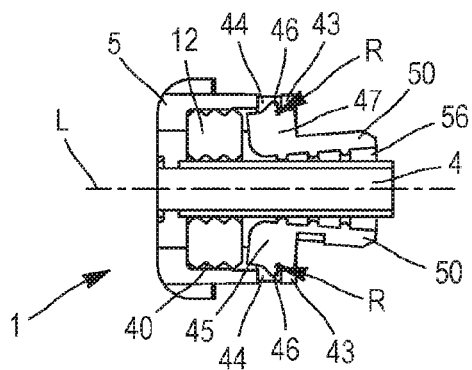
FIGS. 3A to 3D schematically show respectively, in axial section, the steps of insertion and clamping of the clamping ring on the bushing of the device of FIG. 1.
Figure 3B:
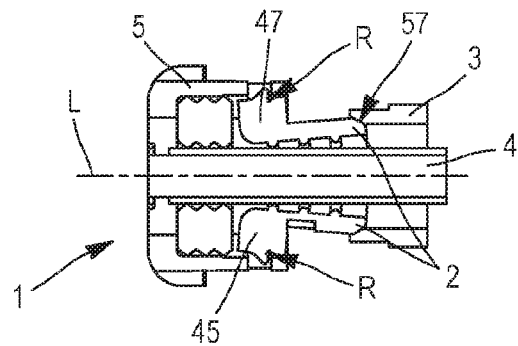

As illustrated in FIGS. 2C and 2D, a lower plate 45, combining three half-bushings 50 in a single piece, is placed at the rear of the three cavities 40. This lower plate 45 is placed beneath the cables 4 and is held on the three lower flange portions 43 at least in part by means of three lugs 46 each inserted, respectively, into an opening 44 (see also FIG. 3A). Similarly, an upper plate 47, similar to the lower plate 45, is placed symmetrically above the cables 4 with respect to the lower plate 45 and is held on the three upper flange portions 43 at least in part by means of three lugs 46 each inserted, respectively, into an opening 44 (FIGS. 2D and 3A). The lower 45 and upper 47 plates are therefore articulated around points of rotation R located substantially at the lugs 46 inserted into the openings 44. In other words, the lower 45 and upper 47 plates are each articulated, respectively, about an axis of rotation passing through three of these points of rotation R, said axes of rotation being symmetrical to one another with respect to a plane passing substantially through the longitudinal axes of the cables 4.

Once in place, each pair of half-bushings 50 opens like a jaw. In this position of the half-bushings 50, the cables 4 are not yet blocked and can be displaced through the passage formed between said half-shells (see FIGS. 2D and 3A).

Each element formed of a plate 45, 47 and three half-bushings 50 carried thereby is L-shaped in section perpendicular (plane of FIGS. 3A to 3D) to its axis of rotation and passing through the points of rotation R. One of the branches of this L corresponds to a half-bushing 50 and the other of these branches corresponds to a plate 45 or 47 connecting the three half-bushings 50 to one another. The lugs 46 are located at the tip of the free end of the branch of the plate 45, 47 (see in particular FIGS. 3A to 3D).

When the half-bushings 50 are joined to one another, the respective plates 45, 47 are aligned (FIGS. 2E to 2G, 3C and 3G). One of the advantages of having a sole element formed of a plate 45, 47 and a number of bushing portions (here three half-bushings 50), said element being common to a number of cables 4 (and possibly identical on either side of the cables 4), lies in the fact that this reduces the number of parts to be produced, handled and assembled.

Each bushing portion (here a half-bushing 50) comprises an inner surface 34 corresponding to a cylinder portion (here substantially hemicylindrical). Bringing the bushing portions toward one another makes it possible to form a complete bushing 2 in the form of a hollow sleeve, one around each cable 4, with an essentially cylindrical inner wall 52 assuring the clamping of a cable 4 and with an outer wall 54, which likewise is essentially cylindrical and on which a clamping ring 3 is placed. In accordance with variants the bushing portions could correspond to portions smaller than a cylinder and longitudinal slots could be formed, in the complete bushing, between the bushing portions. In other words the bushing portions are not necessarily joined in the complete bushing. The bushing 2 and the clamping ring 3 each comprise an opening 26, 27 for passing through a cable 4. Each clamping ring 3 can then be inserted on a bushing (see FIGS. 2E, 2F, 3B and 3C).

Each clamping ring 3 and each half-bushing 50 has beveled surfaces 57, sliding over one another so as to facilitate the insertion of each clamping ring 3 on a bushing 2. When a clamping ring 3 is moved in translation longitudinally along a bushing 2, toward a seal 12, said clamping ring is displaced, relative to the bushing 2, from a position in which the cable 4 can be displaced into a position in which the cable 4 is blocked. At the same time, the half-bushings 50 and the plates 45, 47 pivot about the axis of rotation in order to bring said plates toward one another.

Figure 2F:
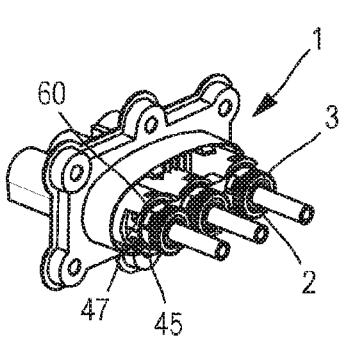
Figure 3C:
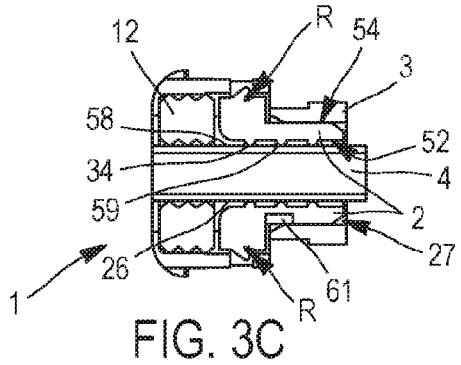

When a clamping ring 3 is abutted against the lower 45 and upper 47 plates, the bushing 2 on which said clamping ring is mounted is completely locked on the cable 4, and said cable is blocked (see FIGS. 2F and 3C).

Figure 5:
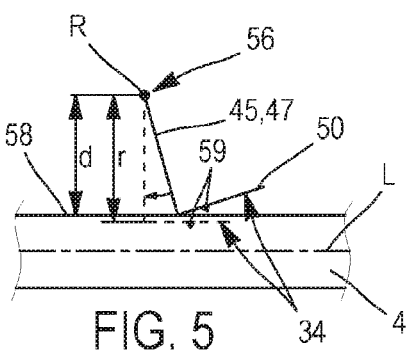
FIG. 5 schematically shows the articulation of a movable bushing portion of a device or of a connector according to the invention.
Figure 6:
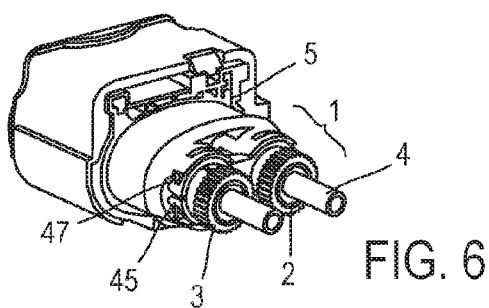
FIG. 6 schematically shows, in a perspective view, an electrical connector according to the invention.

As shown schematically in FIG. 5, so that the cable 4 can be blocked during the rotation of the lower 45 and upper 47 plates about the axis of rotation thereof, it is necessary for a least a portion of the inner surface 34 to be distanced from the axis of rotation by a radius r greater than the distance d between the axis of rotation and the outer surface 58 of the cable 4. In order to increase the efficacy of the blocking, the inner surface of the sleeves comprises ribs 59, of which the inner diameter, once the lower 45 and upper 47 plates have been brought toward one another, is smaller than the outer diameter of the insulating sheath of the cable 4.

In order to ensure that each clamping ring 3 will not escape from the bushing 2 on which it is mounted, each clamping ring 3 is held on a bushing 2 non-rotatably by locking means. These locking means comprise ramps 21 on each bushing 2 and on each clamping ring 3 (see FIGS. 4A and 4B) and are arranged in a circular manner about the longitudinal axis L of the cables 4.

Figure 2G:
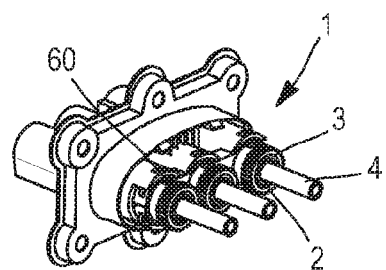

By rotating a clamping ring 3 with respect to a bushing 2 by substantially less than a quarter of a turn (see visual displacement references 60 between their unlocked position in FIG. 2F and their locked position in FIGS. 1 and 2G), said clamping ring is locked on said bushing 2.

Figure 3D:
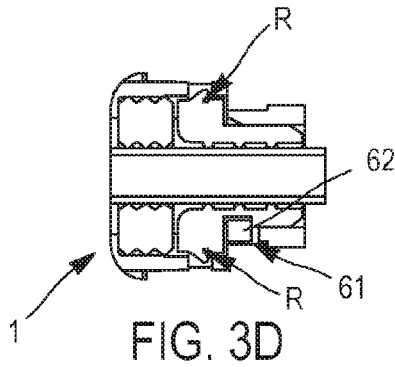
Figure 4A:
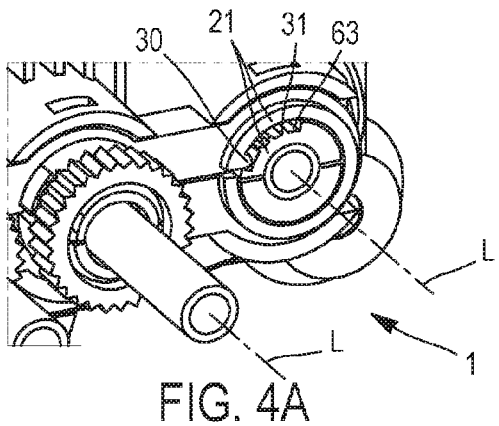
FIGS. 4A and 4B schematically show in detail, in perspective and partially in section, the clamping of the clamping ring on the bushing of the clamping device of FIG. 1.

As can be seen in FIG. 4A, the clamping ring 3 is held in an unlocked (or pre-locked) position thanks to a tooth 30, which cooperates with an indentation 29 preceding a series of teeth 31 located on a ramp 21 and protruding on the inner surface of the clamping ring 3. As shown in FIGS. 3C and 3D, each bushing 2 comprises a circular recess portion 61 suitable for receiving a pin 62 protruding on the inner surface of the clamping ring. In an unlocked position of the clamping ring 3, the pin 62 is not engaged with this circular recess portion 61, and the clamping ring 3 can therefore be removed from the bushing 2.

Figure 4B:
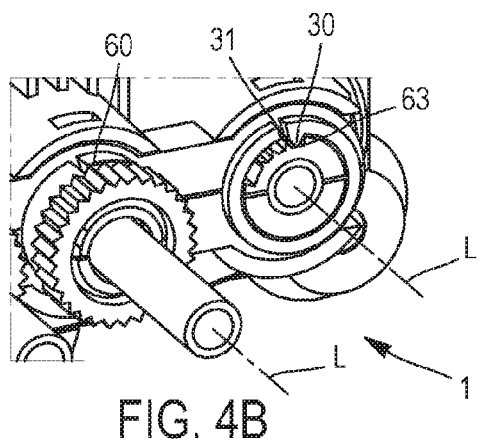

In FIGS. 3D and 4B, after rotation through approximately a quarter of a turn of the clamping ring 3, the clamping ring 3 is held in a locked position. The pin 62 is now engaged with the circular recess portion 61, and the clamping ring 3 therefore can no longer be removed from the bushing 2. The tooth 30 has slid over the set of teeth 31, so as to become housed in a notch 63. The teeth 30, 31 constitute locking means with non-return catches. The visual displacement reference 60 is now located opposite an opening 44.

FIG. 5 shows another embodiment of the invention. This is an electrical connector. It comprises a casing 5 and two contacts, each clamped on a cable 4. A clamping device 1 as described above, but having two bushings 2 and 2 clamping rings 3 (instead of three) is formed integrally (for example by molding) with the casing 5 in order to limit the propagation of vibrations from the cable 4 to the contacts.

The invention claimed is:

1. An electrical connector, comprising:
   a casing;
   a cable clamping device;
   a bushing; and
   a clamping ring, wherein the bushing and the clamping ring each comprise a cable opening extending along a longitudinal axis substantially perpendicularly through the cable opening, wherein at least one of the bushing and the clamping ring has an inner surface intended to press against an outer surface of a cable in order to block said cable, when the clamping ring is manipulated so as to be displaced, relative to the bushing, from a displacement position in which the cable can be displaced into a block position in which the cable is blocked, wherein said cable clamping device also comprises locking means carried at least in part by the clamping ring and having at least one non-return catch, wherein the bushing is articulated to a flange of the casing and is movable between an unclamped position of the bushing, in which the cable can be displaced, and a clamped position, in which the bushing is held clamped on the cable by the clamping ring, wherein the bushing is mounted on the flange of the casing so as to be removable, wherein the bushing comprises at least one bushing portion, carried at least in part by a plate provided with at least one lug inserted into an opening which holds, at least in part, the plate on a portion of the flange, and wherein the bushing-comprises two movable bushing portions forming half-bushings each carried by a separate plate and articulated about axes of rotation symmetrical to one another with respect to the longitudinal axis of a cable passage.

2. The connector according to claim 1, wherein the bushing is mounted on the flange of the casing so as to be removable.

3. The connector according to claim 2, wherein the plate is articulated about an axis of rotation and a movable bushing portion comprises an inner surface in contact with the cable, wherein a distance between the inner surface and the axis of rotation is greater than a distance between the axis of rotation and the outer surface of the cable when the bushing is clamped on the cable.

4. The connector according to claim 3, wherein the clamping ring and the bushing have beveled surfaces, which slide over one another when the clamping ring is manipulated so as to be displaced, with respect to the bushing, from the displacement position into the block position, and so as to pivot an assembly formed by the plate and the movable bushing portion about the axis of rotation.

5. The connector according to claim 1, wherein the locking means are complementary and are carried, respectively, in part on the bushing and in part on the clamping ring.

6. The connector according to claim 5, wherein the locking means comprise a tooth defined by one of the clamping ring and the bushing, said tooth engaging, respectively, a notch defined by the bushing and the clamping ring.

7. The connector according to claim 2, wherein a displacement of the clamping ring with respect to the bushing comprises a translation in order to insert the clamping ring on the bushing and a rotation in order to lock the clamping ring on the bushing.

8. An electrical connector, comprising:
a casing;
a cable clamping device;
a bushing; and
a clamping ring, wherein the bushing and the clamping ring each comprise a cable opening extending along a longitudinal axis substantially perpendicularly through the cable opening, wherein at least one of the bushing and the clamping ring has an inner surface intended to press against an outer surface of a cable in order to block said cable, when the clamping ring is manipulated so as to be displaced, relative to the bushing, from a displacement position in which the cable can be displaced into a block position in which the cable is blocked, wherein said cable clamping device also comprises locking means carried at least in part by the clamping ring and having at least one non-return catch, wherein the bushing is articulated to a flange of the casing and is movable between an unclamped position of the bushing, in which the cable can be displaced, and a clamped position, in which the bushing is held clamped on the cable by the clamping ring, wherein the bushing is mounted on the flange of the casing so as to be removable, wherein the bushing comprises at least one bushing portion, carried at least in part by a plate provided with at least one lug inserted into an opening which holds, at least in part, the plate on a portion of the flange, and wherein the plate carries at least two movable bushing portions and is common to at least two cable passages.

9. The connector according to claim 8, wherein the bushing is mounted on the flange of the casing so as to be removable.

10. The connector according to claim 9, wherein a displacement of the clamping ring with respect to the bushing comprises a translation in order to insert the clamping ring on the bushing and a rotation in order to lock the clamping ring on the bushing.

11. The connector according to claim 9, wherein the plate is articulated about an axis of rotation and a movable bushing portion comprises an inner surface in contact with the cable, wherein a distance between the inner surface and the axis of rotation is greater than a distance between the axis of rotation and the outer surface of the cable when the bushing is clamped on the cable.

12. The connector according to claim 11, wherein the clamping ring and the bushing have beveled surfaces, which slide over one another when the clamping ring is manipulated so as to be displaced, with respect to the bushing, from the displacement position into the block position, and so as to pivot an assembly formed by the plate and the movable bushing portion about the axis of rotation.

13. The connector according to claim 8, wherein the locking means are complementary and are carried, respectively, in part on the bushing and in part on the clamping ring.

14. The connector according to claim 13, wherein the locking means comprise a tooth defined by one of the clamping ring and the bushing, said tooth engaging, respectively, a notch defined by the bushing and the clamping ring.

* * * * *